Aug. 3, 1965   W. L. BOWEN III   3,198,223
END GUIDE FOR CHAIN SAW
Original Filed Dec. 27, 1961

WILLARD L. BOWEN III
INVENTOR

ATTORNEYS

United States Patent Office 3,198,223
Patented Aug. 3, 1965

3,198,223
END GUIDE FOR CHAIN SAW
Willard L. Bowen III, Harwinton, Conn., assignor to The Torrington Company, Torrington, Conn., a corporation of Maine
Continuation of application Ser. No. 162,414, Dec. 27, 1961. This application Nov. 12, 1963, Ser. No. 325,201
3 Claims. (Cl. 143—32)

This application is a continuation of my copending application Serial No. 162,414, filed December 27, 1961, now abandoned.

The following specification relates to an improved antifriction end guide for a chain saw.

The usual chain saw guide assembly is subject to limitation in the speed permitted the saw chain by reason of the extended surfaces subject to friction of moving parts. One of the problems of such end guides is to maintain an adequate flow of lubricant to the chain and the guide so that the latter will not be heated beyond a safe limit.

One of the objects of the invention is to minimize the amount of surface subject to friction of moving parts.

A further object of the invention is to design the end guide so that all parts are concealed except the moving pulley for the chain saw proper.

A still further object of the invention is to design an end guide in which a flow of lubricant is maintained from a central chamber to the antifriction bearing and the surrounding bearing race.

Among the objects of the invention is to use the restricted cross-section of the end pulley for holding the latter in the normal plane of operation in reference to its mounting.

Figure 1:
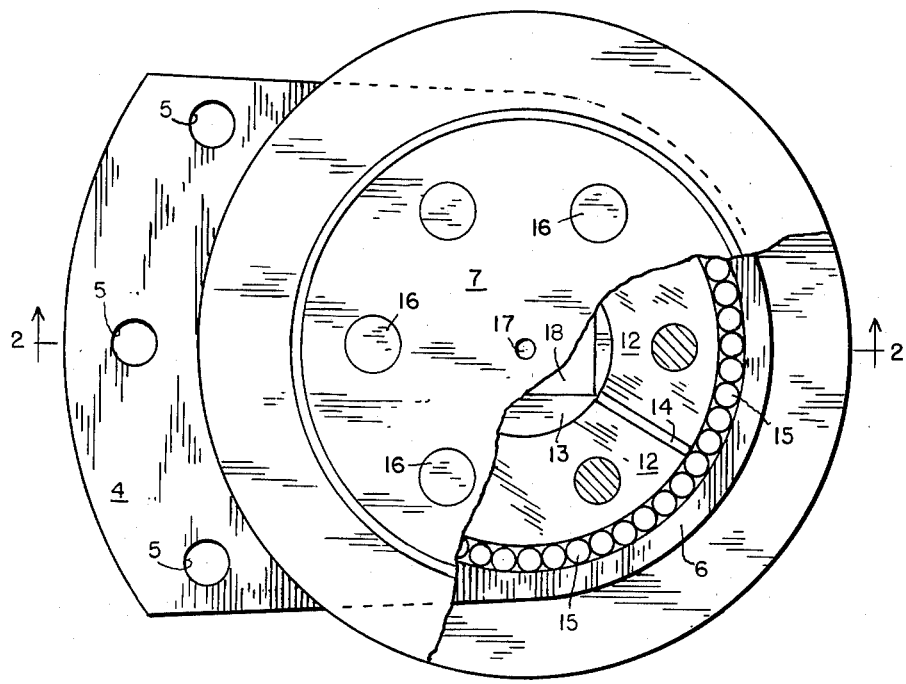
Figure 2:
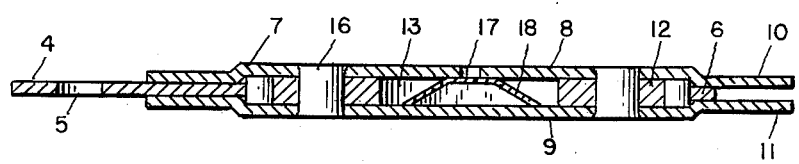

Other objects of the invention will be evident from the following description of the preferred form of the invention as illustrated in the accompanying drawings in which:

FIGURE 1 is a side view with parts broken away of the improved antifriction end guide and FIGURE 2 is a transverse longitudinal section on the line 2—2 of FIGURE 1.

Briefly described, the invention comprises a mounting plate for attachment to a chain guide bar and provided with a chain idler pulley of an efficient antifriction design.

In the drawings I have illustrated a mounting plate 4 having holes 5 by which it is firmly bolted on the outer end of a chain saw bar. This plate is made of hardened steel or the like with the sides of maximum smoothness to reduce friction of moving parts.

One end of the plate 4 is extended to form the integral ring 6. This ring is the outer race for an antifriction bearing.

A pulley 7 is mounted within the ring 6. The pulley comprises two side plates 8 and 9 having flanges 10 and 11 inwardly offset to fit slidably over the sides of the plate 4. The flanges 10 and 11 are designed to receive the driving chain of a chain saw. Consequently the thickness of the plate 4 is also substantially as wide as the space between the flanges 10 and 11.

These side plates 8 and 9 are hardened and tempered before assembly.

The hub of the pulley is an annular hardened spacer and bearing ring 12 materially thicker than the plate 4. This constitutes the inner race of the antifriction bearing.

The ring 12 is provided with a central lubricant chamber 13. One face of the ring 12 is grooved as shown at 14 to provide a radial passageway for lubricant to the space between the ring 12 and the outer ring 6.

A full complement of bearing rollers 15 occupies the space between the outer ring 6 and the inner ring 12.

Rivets 16 or other similar permanent fastenings are used to hold the plates 8 and 9 and the intervening ring 12 together.

One of the side plates has a central hole 17 through which a supply of lubricant may be introduced into the chamber 13. The lubricant is prevented from leaking through the hole 17 by means of a resilient plate 18. This plate fits closely against the inner end of the hole 17. It is displaced while lubricant is being introduced, but immediately resumes its normal position blocking exit through the hole 17.

It will be evident from FIGURE 2 that the plate 4 and the ring 6 are sufficiently within the upset portions 10 and 11 so that the slope of those portions from the side plates 8 and 9 is beyond the path of the rollers 15. In this way the rollers are confined between the sides 8 and 9 and the only rolling contact is between the outer surface of the ring 12 and the inner edge of the plate.

The improved end guide is assembled by arranging the lower plate 9 opposite the opening within the ring 6 and then inserting the ring 12. The roller bearings 15 or equivalent antifriction elements are then filled in the space between the ring 12 and the plate 4. In assembling the ring 12, the rivets 16 will serve to maintain the ring 12 equally spaced from the ring 6. The closure plate 18 is then placed within the ring 12. The upper side plate 8 is fitted on the rivets 16 in proper spacing with the remaining parts of the device. Upsetting the rivets 16 completes a permanent attachment of the parts together.

The end guide is then ready for attachment by means of the plate 4 to the chain saw bar.

The driving chain of the chain saw travels between the spaced flanges 10 and 11. These rotate together with minimum friction. The only other frictional engagement is between the plate 4 and the ring 5 and the inner surface of the flanges 10 and 11. This results in a minimum of frictional engagement. Centrifugal effect on the lubricant contained in the chamber 13 will cause a graduated amount of flow through the grooves 14 directly to the antifriction bearing. From there the lubricant will flow in adequate supply over the opposite faces of the plate 4 and the ring 6. In the course of this discharge, the inner side walls of the flanges 10 and 11 are also lubricated where they are in contact with the driving links of the chain saw.

The above design results in a simple but rugged construction. It permits a maximum of strength and at the same time a minimum of frictional wear. The pulley will therefore rotate freely. The slight surfaces subject to heat from friction are so placed that the flanges of the pulley will rapidly dissipate the heat and maintain the pulley in cool operation.

Additionally since the outer plates rotate, they tend to be self-cleaning and sawdust, dirt and other foreign matter are thrown out of the space between the side plates 10 and 11 and the mounting plate 4.

The invention has been illustrated and described in the preferred form without limitation other than by the terms of the following claims.

What I claim is:

1. An antifriction end guide for a chain saw comprising a thin mounting plate having an inner surface defining an outer bearing race surrounding a bore through said mounting plate, a bearing ring extending through said mounting plate bore, said bearing ring having an outer surface defining an inner bearing race opposing said outer bearing race, said inner bearing race being of a greater width than said outer bearing race and projecting to opposite sides thereof, a series of antifriction bearing rollers positioned between said bearing races and supporting said bearing ring, said bearing rollers being of a length in excess of the width of said outer bearing race, and a pair of side disks secured to faces of said bearing ring and projecting radially outwardly beyond said outer bearing race, said side disks having axially offset outer flanges disposed in closely adjacent relation to said mounting plate and said flanges having radially inwardly facing edge portions opposing said bearing rollers and combining with said outer race to confine said bearing rollers.

2. The antifriction end guide of claim 1 wherein said bearing ring is of an annular configuration and in combination with said side plates defines a central lubricant chamber, and a radial lubricant passage through said bearing ring for supplying lubricant to said bearing rollers.

3. The antifriction end guide of claim 2 wherein one of said side plates has a lubricant delivery opening, and a resilient valve plate within said bearing ring and reacting against the other of said side plates normally closing said lubricant delivery opening.

References Cited by the Examiner
UNITED STATES PATENTS 2,693,206  11/54  Anttonen _____ 143—32
2,888,964   6/59  Mall.

WILLIAM W. DYER, Jr., *Primary Examiner.*

DONALD R. SCHRAN, *Examiner.*